(12) United States Patent
Yamada

(10) Patent No.: US 9,800,360 B2
(45) Date of Patent: Oct. 24, 2017

(54) MANAGEMENT OF STATIONS USING PREFERENCES FROM SOCIAL NETWORKING PROFILES

(71) Applicant: Honda Motor Co., Ltd., Tokyo (JP)

(72) Inventor: Hajime Yamada, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 215 days.

(21) Appl. No.: 14/174,482

(22) Filed: Feb. 6, 2014

(65) Prior Publication Data

US 2015/0222375 A1  Aug. 6, 2015

(51) Int. Cl.
G06F 17/30 (2006.01)
H04H 60/46 (2008.01)
H04M 1/725 (2006.01)
H04H 60/80 (2008.01)

(52) U.S. Cl.
CPC ............ *H04H 60/46* (2013.01); *H04H 60/80* (2013.01); *H04M 1/7253* (2013.01)

(58) Field of Classification Search
None
See application file for complete search history.

(56) References Cited

U.S. PATENT DOCUMENTS

| | | | |
|---|---|---|---|
| 5,497,455 A | 3/1996 | Suga et al. | |
| 5,812,128 A | 9/1998 | Sterling, IV | |
| 6,374,177 B1 | 4/2002 | Lee et al. | |
| 6,529,804 B1 | 3/2003 | Draggon et al. | |
| 6,615,248 B1 | 9/2003 | Smith | |
| 6,725,022 B1 * | 4/2004 | Clayton | G01C 21/362 455/150.1 |
| 6,871,143 B2 | 3/2005 | Fujiwara | |
| 7,155,339 B2 | 12/2006 | Tu | |
| 7,512,495 B2 | 3/2009 | Obradovich | |
| 7,640,099 B2 | 12/2009 | Tran | |
| 7,730,401 B2 | 6/2010 | Gillespie et al. | |
| 8,249,805 B2 | 8/2012 | de Silva et al. | |
| 8,276,093 B2 | 9/2012 | Matsushima et al. | |
| 8,290,781 B2 | 10/2012 | Gazdzinski | |
| 8,301,371 B2 | 10/2012 | Sheha et al. | |
| 8,326,527 B2 | 12/2012 | Ross et al. | |
| 8,428,874 B2 | 4/2013 | Park et al. | |
| 8,464,180 B1 | 6/2013 | Kirkham et al. | |
| 8,494,768 B2 | 7/2013 | Solkesz et al. | |
| 8,504,286 B2 | 8/2013 | Agarwal et al. | |

(Continued)

*Primary Examiner* — Aleksandr Kerzhner
*Assistant Examiner* — Eddy Cheung
(74) *Attorney, Agent, or Firm* — Rankin, Hill & Clark LLP

(57) ABSTRACT

One or more embodiments of techniques or systems for content management are provided herein. In one or more embodiments, a user may preconfigure a device with preset stations or favorite stations, such as via an application on the device. The device may be utilized to synchronize a vehicle with the preset stations or favorite stations. In one or more embodiments, merely preset stations may be accessible on the vehicle during some scenarios to promote safe driving. For example, in such scenarios, merely the preset stations may be marked or defined as a favorite. In one or more embodiments, presets or favorites may be presented or organized based on characteristics of a user or other attributes, such as the time of day. In this manner, content management may be provided while promoting safe driving.

19 Claims, 7 Drawing Sheets

(56) References Cited

U.S. PATENT DOCUMENTS

| | | |
|---|---|---|
| 8,543,333 B2 | 9/2013 | Lee et al. |
| 8,560,231 B2 | 10/2013 | Vu et al. |
| 2003/0013425 A1* | 1/2003 | Nee .................. H03J 1/0058 455/186.1 |
| 2003/0014767 A1* | 1/2003 | Stumphauzer, II .... H04N 7/163 725/131 |
| 2005/0080555 A1* | 4/2005 | Parupudi ............. G06F 17/3087 709/217 |
| 2005/0273251 A1 | 12/2005 | Nix et al. |
| 2005/0278080 A1* | 12/2005 | Pilgrim ............... B60R 16/0231 701/1 |
| 2006/0128301 A1* | 6/2006 | Dorfstatter ............ H04H 20/62 455/3.04 |
| 2007/0112476 A1* | 5/2007 | Obradovich ........ B60R 16/0231 701/1 |
| 2007/0288961 A1* | 12/2007 | Guldi .................. H04N 7/0885 725/46 |
| 2008/0218409 A1* | 9/2008 | Moinzadeh .......... G11B 27/034 342/357.64 |
| 2009/0018766 A1 | 1/2009 | Chen et al. |
| 2009/0023406 A1* | 1/2009 | Ellis ........................ H04B 1/20 455/140 |
| 2009/0176469 A1* | 7/2009 | Nagara .................. B60R 11/02 455/186.1 |
| 2009/0210153 A1 | 8/2009 | Listle et al. |
| 2009/0307018 A1 | 12/2009 | Chappell et al. |
| 2009/0307262 A1* | 12/2009 | Jeong .................. G06F 17/3087 |
| 2010/0070931 A1 | 3/2010 | Nichols |
| 2010/0087207 A1 | 4/2010 | Tsurutome et al. |
| 2010/0106514 A1 | 4/2010 | Cox |
| 2010/0131844 A1* | 5/2010 | Wohlert ............ G06F 17/30029 715/716 |
| 2010/0178938 A1* | 7/2010 | Ingrassia, Jr. .......... H04H 60/65 455/456.3 |
| 2010/0250108 A1 | 9/2010 | Tourunen et al. |
| 2011/0281538 A1 | 11/2011 | Morrison et al. |
| 2012/0022787 A1 | 1/2012 | LeBeau et al. |
| 2012/0064820 A1* | 3/2012 | Bemmel ............. G08G 1/0141 455/3.02 |
| 2012/0278745 A1 | 11/2012 | Kim et al. |
| 2013/0131986 A1 | 5/2013 | Van Seggelen et al. |
| 2013/0139102 A1 | 5/2013 | Miura et al. |
| 2013/0197796 A1 | 8/2013 | Obradovich et al. |
| 2013/0211719 A1 | 8/2013 | Boschker et al. |
| 2013/0254715 A1 | 9/2013 | Park |
| 2014/0074861 A1* | 3/2014 | Bieschke ............. G06F 17/3053 707/748 |
| 2014/0164579 A1* | 6/2014 | Douthitt ................. G07C 5/008 709/219 |
| 2014/0188920 A1* | 7/2014 | Sharma ............. G06F 17/30761 707/758 |
| 2015/0186454 A1* | 7/2015 | Kim ........................ H04L 65/60 707/758 |

* cited by examiner

MANAGEMENT OF STATIONS USING PREFERENCES FROM SOCIAL NETWORKING PROFILES

BACKGROUND

Generally, vehicles are equipped with tuners or components that enable occupants of the vehicle to receive radio frequency transmissions (e.g., broadcast radio) by converting a carrier frequency and corresponding bandwidth into a fixed frequency which may be suitable for signal processing. For example, a radio signal may be demodulated, thereby providing an audio frequency signal. Users may add radio stations to presets on a vehicle, thus enabling the user to quickly access stations stored as a preset. For example, a radio equipped on a vehicle may come equipped with ten buttons (e.g., 0-9) which would allow a user to store ten (or more) presets by depressing and holding a button while a radio station at a particular frequency is selected.

However, with the advent of more stations or additional channels, such as due to satellite radio, for example, users may have hundreds, if not more stations to select from. As a result of this, navigation through the stations, channels, or presets may be increasingly difficult. Similarly, editing, setting, or defining favorites or presets may be distracting, particularly when a driver is operating a vehicle.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

One or more embodiments of techniques or systems for content management are provided herein. A system for content management is provided such that a user or driver of a vehicle may safely manage one or more stations. As used herein, a station may be a channel, a radio station, a content station, a shortcut, podcast, or other content which may be broadcast or pre-recorded, for example. In other words, a station is not limited to a radio channel or a television channel, and is intended to include content channels, such as internet streams, podcasts, or other forms of media which may be consumed. In one or more embodiments, a user may manage one or more stations by assigning, designating, or defining one or more of the stations as a preset. This may be achieved by providing a list of available stations, or multiple lists of stations sorted by category, for example, and enabling the user to mark or designate individual stations or groups of stations to correspond to one or more preset buttons. For example, if a vehicle is equipped with a dashboard interface which includes ten physical preset buttons (or software buttons), a user may be able to assign a station to one of the preset buttons by depressing and holding a corresponding preset button while a station is selected, active, or currently playing. In this way, presets may be assigned or designated by a user.

Similarly, a user may assign, designate, or define one or more of the stations associated with a preset as a favorite station. In one or more embodiments, this may be achieved by providing a list of available presets, and enabling the user to mark or designate one or more of the preset stations as a favorite. In this way, favorites may be assigned or designated by a user. In one or more embodiments, the user may be required to add a station as a preset prior to marking or designating that station as a favorite. For example, this may be done to promote safer driving so that a driver is not fumbling through a plurality or multitude of available stations to set as a favorite.

Additionally, activity (e.g., setting presets, favorites, channels, or stations listed to, etc.) which occurs on board of the vehicle may be synchronized across other devices. For example, a communication component of the system for content management may couple the system to a mobile device. To this end, an application on the mobile device may be utilized by the user to organize presets or favorite stations prior to operating the vehicle and synchronize presets, favorites, or available stations on the vehicle. The communication component may also transmit activity or user activity on the vehicle to the mobile device or a cloud. For example, if a user redefines or changes a preset to a favorite station utilizing an interface located on-board of the vehicle, such changes may be synchronized with the application of the mobile device.

Further, in one or more embodiments, one or more changes, user input, or user activity may be selectively synchronized based on a variety of factors. For example, if a user creates a workout playlist or station on the mobile device and marks the workout station as a favorite on the mobile device, that station or playlist may not necessarily be synchronized with the vehicle based on the name of the station, a purpose associated with the station, or a location associated with the station while it is being utilized on the mobile device (e.g., a gym). As a result, the workout station (e.g., which is marked as a favorite on the mobile device) may be synchronized with the vehicle (e.g., or not at all) based on a determination that the workout station has little or no applicability to the vehicle setting.

The following description and annexed drawings set forth certain illustrative aspects and implementations. These are indicative of but a few of the various ways in which one or more aspects are employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
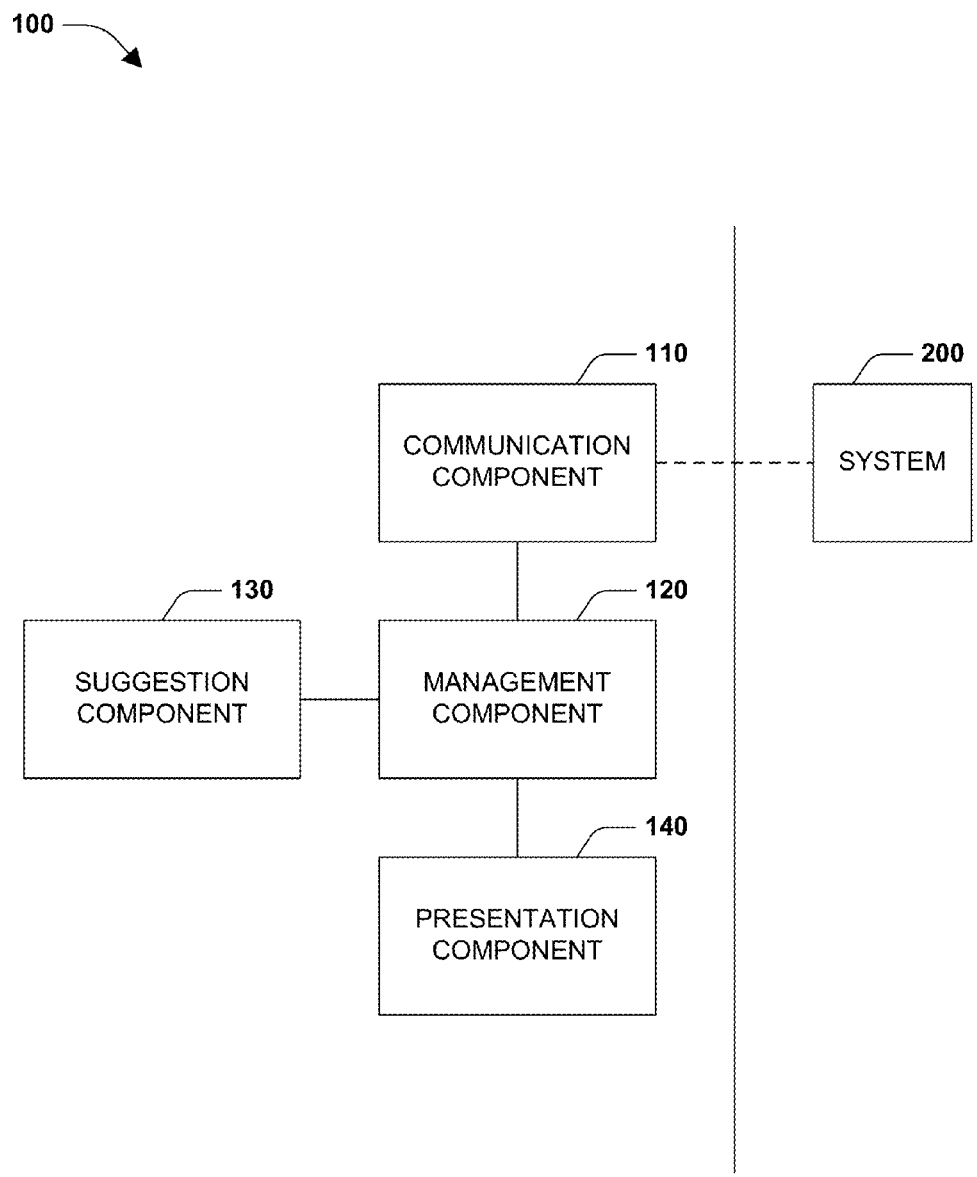
FIG. 1 is an illustration of an example system for content management, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 7:
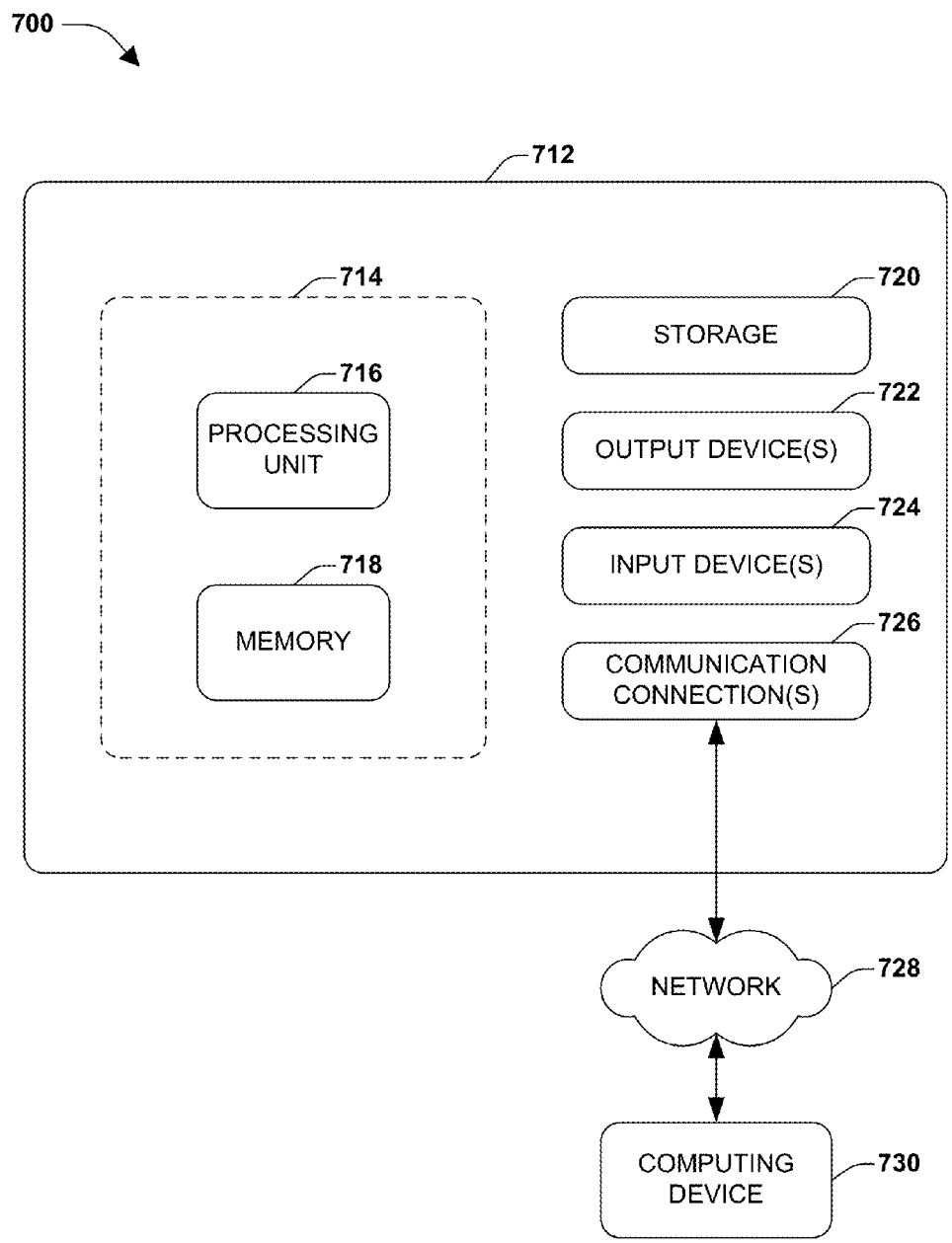
FIG. 7 is an illustration of an example computing environment where one or more of the provisions set forth herein are implemented, according to one or more embodiments.

For one or more of the figures herein, one or more boundaries, such as boundary 714 of FIG. 7, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

One or more embodiments of techniques or systems for content management are provided herein. These techniques or systems allow users or drivers of vehicles to manage or organize one or more presets or one or more favorites. For example, a pool of available content stations may be presented and a user may organize the respective stations on a device and port or transfer those stations (e.g., as organized) from one device to another. For example, a user may organize a set of stations on a mobile device and utilize the mobile device to port or transfer the set of stations such that a vehicle is setup with similar organization of the stations. As another example, changes made to presets on-board of the vehicle may be recorded and reflected on the mobile device. Vehicle to vehicle synchronization may also occur through a cloud, a wireless connection, near field communication, Bluetooth, etc.

FIG. 1 is an illustration of an example system 100 for content management, according to one or more embodiments. The system 100 for content management may include a communication component 110, a management component 120, a suggestion component 130, and a presentation component 140. The communication component 110 enables the system 100 to communicate with other devices, mobile devices, other vehicles, a cloud, etc. For example, the communication component 110 may receive station information, which may include data, a list of stations, a list of presets, or a list of favorites from another system 200.

Similarly, the communication component 110 may transmit or send station information to other devices or systems, such as system 200, thereby enabling communication between the system 100 and another system 200. In other words, the communication component 110 may enable data transfer between a vehicle and a mobile device, for example, by communicatively coupling a communication component 110 of the vehicle (e.g., or system 100) to the mobile device (e.g., system 200). The communication component 110 may transmit or receive station information, data, input, user input, user activity, such as a station selection via a Bluetooth channel, WiFi, a wired connection, a universal serial bus (USB), telematics, a cloud, etc.

As will be discussed herein, an application of the mobile device may be utilized to define or designate one or more stations as a preset station, a favorite station, or assign other status indicators. Similarly, the management component 120 may be employed to organize one or more stations. In one or more embodiments, one or more of the stations being organized or managed by the management component 120 may be defined or designated as a preset, a preset station, a favorite, a favorite station, etc. by a user via the application on the mobile device. As previously discussed, a station may include a channel, media, streaming content, or other content, and is not necessarily limited to a radio station or a television station.

As an example, the management component 120 may receive one or more stations defined by or configured by the application of the mobile device. In this way, a user may configure or setup a list of stations off board of the vehicle using the mobile device and corresponding application and port or synchronize those stations with the vehicle via the communication component 110 and organize the same utilizing the management component 120. For example, a list of one or more preset stations and a list of one or more favorite stations may be created within an application of system 200 (e.g., a mobile device or other device). The communication component 110 may communicatively couple the system 200 with system 100, thereby enabling the management component 120 to organize one or more of the preset stations or one or more of the favorite stations.

In one or more embodiments, one or more of the stations may be organized based on whether a station of one or more of the stations is classified, defined, or designated as a preset station or a favorite station. The management component 120 may provide a menu bar with one or more options, such as mode select, add to preset, add to favorite, next station, select, deselect, favorites, presets, or one or more options. For example, when the presets button is selected, one or more presets may be presented. Similarly, when the favorites button is selected, one or more favorites may be presented, such as to a user. In this way, the management component 120 may organize presets, favorites, or stations (e.g., which were configured on another device 200 or configured via an interface on the vehicle or system 100).

The management component 120 may also include an interface for user interaction, such as physical buttons '0'-'9', for example. In this example, the respective buttons may be utilized to recall stations stored as a preset station or stations stored as a favorite station. Further, the buttons may be utilized to set, define, or designation stations as preset stations or favorite stations. When a user depresses a button and holds the button for a period of time, a current station may be associated with that button as a preset or as a favorite. When the user depresses the button for a moment without reaching the period of time, a station selection is received by the management component 120. The management component 120 may tune the system 100 to the corresponding station to facilitate playback of the station associated with the station selection. For example, the management component 120 may receive one or more stations from a cloud (e.g., internet radio, podcasts, or other content). The management component 120 may also enable tuning of radio stations across frequency modulation (FM) bands or amplitude modulation (AM) bands.

The management component 120 may enable operation of the system 100 in one or more modes. For example, the management component 120 may have a mode select button which may be a software button or a physical button, which when depressed may enable users to select or cycle through different modes. One or more of the modes may include a preset mode, a shuffle mode, an artificial intelligence pick mode, etc. A current mode may be shown at a top of a display or at a top level of a display. A top level of a display or a top screen may be organized hierarchically such that featured stations may be added to a presets group, tagged, or defined as a preset through a pull-down menu. In one or more embodiments, users may be required to add stations to a mobile device or to a group of presets before being able to access those stations on a vehicle.

For example, of hundreds or thousands of stations which exist, a user may configure one or more of those featured stations as a preset station utilize an application on his or her mobile device. When a connection between the mobile device and the vehicle is formed, merely stations configured or defined as preset stations may be made available to the user, thereby mitigating the user from searching through unwanted stations or being distracted by available stations, for example. In one or more embodiments, users may be required to add stations to a presets group before being able to add any stations to a favorites. Similarly, this may mitigate users from browsing through available stations, thereby facilitating keeping a driver or operator of a vehicle to keep their eyes or focus on the road.

In one or more embodiments, the management component 120 may merely enable a user to move stations from 'preset' to 'favorite' to mitigate the amount of tinkering a driver or user may do while the vehicle is in operation. Here, the communication component 110 may receive one or more indications (e.g., from a controller area network (CAN)) that a vehicle is in motion, above a threshold velocity, in operation, or the keys are in the ignition, etc. In other embodiments, the management component 120 may enable customization of channels or stations when a passenger is detected, for example.

The management component 120 may enable a user to define or redefine one or more stations such that a station that was previously defined as a preset station (e.g., via an application on a mobile device, in a cloud, etc.) is defined or redefined as a favorite in response to a user input. In other words, the management component 120 may be configured to enable users to redefine stations from being a 'preset' station to a 'favorite' station. In one or more embodiments, the management component 120 may enable users to change or redefine merely stations designated as 'preset' stations to 'favorite' stations. In this way, the management component 120 may mitigate distractions associated with assigning stations while the user or driver is operating a vehicle. For example, because the management component 120 may restrict or control a scope of access of channels or stations, such that one or more of the stations are stations previously defined as a 'preset', safety or safe driving may be promoted.

In one or more embodiments, the system 100 merely enables access, controls access, or restricts access to stations based on a status associated with a station (e.g., preset, conditional preset, favorite, featured, selected, unselected, etc.) wherein a user may only access presets or similar stations defined or added via an application on a mobile device (e.g., smartphone) while a vehicle is not is operation or while the mobile device is not connected to the vehicle. In other embodiments, a countdown timer may be associated with one or more of the stations added as a 'preset' (e.g., this may be done via one or more pull-down menus, etc.). For example, when a user utilizes the application on the mobile device to select one or more stations to be presets, access to one or more of those stations may be temporarily blocked or denied. Therefore, a user could not initiate operation of his or her vehicle, utilize the application on the mobile device to setup one or more presets while operating the vehicle, connect the mobile device to the vehicle, and consume the content added while the vehicle was in operation. In this way, the system 100 may promote safer driving (e.g., such as by discouraging setup of content while the vehicle is in operation). Similarly, favorite stations may be added or removed in a manner corresponding to operations described herein which are associated with 'preset' stations.

The management component 120 may assign conditions or condition the display of one or more presets stations or one or more favorite stations based on a variety of factors. For example, the management component 120 may automatically assign a station a 'preset' or a 'favorite' status based on one or more characteristics of a user or one or more attributes associated with a user, one or more characteristics associated with the vehicle, one or more applications associated with a mobile device, one or more characteristics associated with a station, playlist, channel, etc. For example, the management component 120 may assign a status of a station based on a profile associated with the user (e.g., if the user lists a genre of music as an interest in a social networking profile, the management component 120 may promote stations from presets to favorites accordingly). In other embodiments, the management component 120 may display stations based on one or more of the aforementioned characteristics or attributes (e.g., rather than changing the status of a station).

In one or more embodiments, the management component 120 may disable the ability to define or redefine one or more stations based on whether or not the vehicle is in motion or an operation status of the vehicle. In other embodiments, the management component 120 may enable preset stations to be defined or redefined as favorites, but disable other types of defining actions (e.g., un-favorite a station, changing a station from featured status to preset status, etc.) while the vehicle is in an operational mode or in motion.

The management component 120 may enable changes to the status of one or more stations or display of one or more stations based on a global positioning system (GPS) location associated with the vehicle. For example, when a vehicle is determined to be at a location associated with a home or dwelling of a user, the management component 120 may disable display of one or more stations associated with local attractions because the user would presumably be familiar with the area. In another scenario, the management component 120 may assign a station to be a favorite based on the vehicle being within a broadcasting range associated with the station. As the vehicle leaves or travels outside of the broadcasting range, the management component 120 may assign one or more similar stations to replace the station as a favorite or a preset station, for example. The management component 120 may organize, display, or assign a status to one or more stations based on a time, timer, a countdown timer, etc. For example, the management component 120 may enable a user or a driver to assign a station a status (e.g., favorite, preset, etc.) for a period of time, a future time, or according to a schedule. For example, the management component 120 may allow a user to make a station a favorite for the next four hours or make a station a favorite or a preset on Sundays, but not during the rest of the week (e.g., a user may listen to or consume content associated with a station at certain times or seasonally, such as listen to a cast of a professional football game, etc.). In this way, the management component 120 may save a user from scrolling through pages of stations or presets by adjusting the display or presentation of one or more stations or by assigning a corresponding status based on a time of day, day of week, a schedule, a timer, a GPS location, user characteristics, vehicle characteristics, etc.

In other embodiments, the time of day or day of the week may be utilized by the management component 120 to determine when to display or present business related presets or favorites rather than personal presets or personal favorites. Similarly, stations may be presented, displayed, or assigned a status based on a season, time of year, or a snooze feature. For example, a Christmas station may be (e.g., automatically, via the management component 120) promoted from a preset station to a favorite station during the holidays, such as during November and December and hidden the reset of the year. The management component 120 may also enable a user to snooze a station or associated content for a predetermined amount of time. The management component 120 may learn snooze times for a user. For example, if a user snoozes a station, and requests that station a week later, then it may be determined that the user prefers to delay content associated with snoozed stations for about a week. To this end, the management component 120 may automatically, snooze content which is repeated or un-snooze content based on a learned snooze time.

The management component 120 may synchronize the system 100 with another system 200 via the communication component 110. For example, when a user sets up a list of one or more stations as preset stations on a mobile device or system 200, one or more of the preset stations may be synchronized such that those stations may be made available via the presentation component 140 within the system 100. In one or more embodiments, the management component 120 may synchronize one or more of the stations based on one or more conditions, factors, or attributes associated with one or more of the stations. However, one or more stations defined as a favorite or defined as a preset on a mobile device may not be synchronized or ported over to the system 100 or otherwise filtered by the management component 120 based on a name of a station, a GPS location associated with a station, an application associated with a station, etc. For example, if a station is named 'workout' or associated with a playlist or content consumed while the user is working out, the management component 120 may determine that the 'workout' station has less applicability than other stations and synchronize one or more of the stations accordingly. Here, because a user is likely not working out while operating the vehicle, the management component may demote the 'workout' station to a preset station if the 'workout' station is defined as a favorite.

The management component 120 may identify one or more patterns of use associated with one or more stations. For example, if a user listens to or consumes a station while on his or her way to work, that station may be associated with a route, one or more GPS locations, a time frame or time interval etc. Here, the management component 120 may organize that station according to the listening habits of the user, GPS locations, times, etc. associated therewith. Further, the management component 120 may identify one or more associated applications, such as workout applications, etc. which are running in the background on the mobile device to determine a purpose or a context for a station, and organize one or more of the stations based on the purpose or context (e.g., which may be inferred).

The suggestion component 130 may recommend one or more featured stations, preset stations, or favorites based on one or more of the aforementioned characteristics (e.g., user characteristics, vehicle characteristics, etc.). For example, the suggestion component 130 may provide or suggest one or more suggested stations based on user activity, user history, tasks, calendar appointments, GPS location, a calculated route, presumed route, estimated time, etc. When a user is travelling, the suggestion component 130 may suggest stations which recommend or provide food, drinks, fuel, hotels, navigation, traffic, weather, etc. information.

The presentation component 140 may include one or more displays or one or more speakers, wherein one or more of the notifications is a visual notification or audio notification. The presentation component 140 may render a notification of a current mode, a current station, associated progress, one or more preset stations, one or more favorite stations, one or more notifications, etc. One or more of the notifications may be associated with a station corresponding to a station selection, which may be received from a user, for example. The presentation component 140 may render text to speech (TTS) of content associated with a station or current station. For example, a news feed from a social media site or application may be rendered such that a user or driver may receive updates (e.g., news, tweets, etc.) accordingly.

A station may include content associated with an audiobook, business and finance, health and wellness, media and culture, one or more music genres, one or more playlists, news and politics, podcasts, public radio, internet radio, one or more recommendations, social media, sports, technology, etc.

In one or more embodiments, the communication component 110 of the system 100 of FIG. 1 may enable the system 100 to synchronize, transfer, or receive data from one or more mobile devices, one or more other vehicles, a cloud, etc. For example, the communication component 110 may enable the system 100 to synchronize one or more stations with another vehicle (e.g., via another communication component for the other vehicle) or to synchronize the system 100 with a cloud, which may then be accessed by one or more devices or systems, etc. Additionally, content or stations setup on the system 200 may be synchronized to the system 100 or vice versa, for example. In embodiments associated with a cloud, access to information, stations, preferences, presets, favorites, etc. may be provided by entering a login, username, password, etc.

Figure 2:
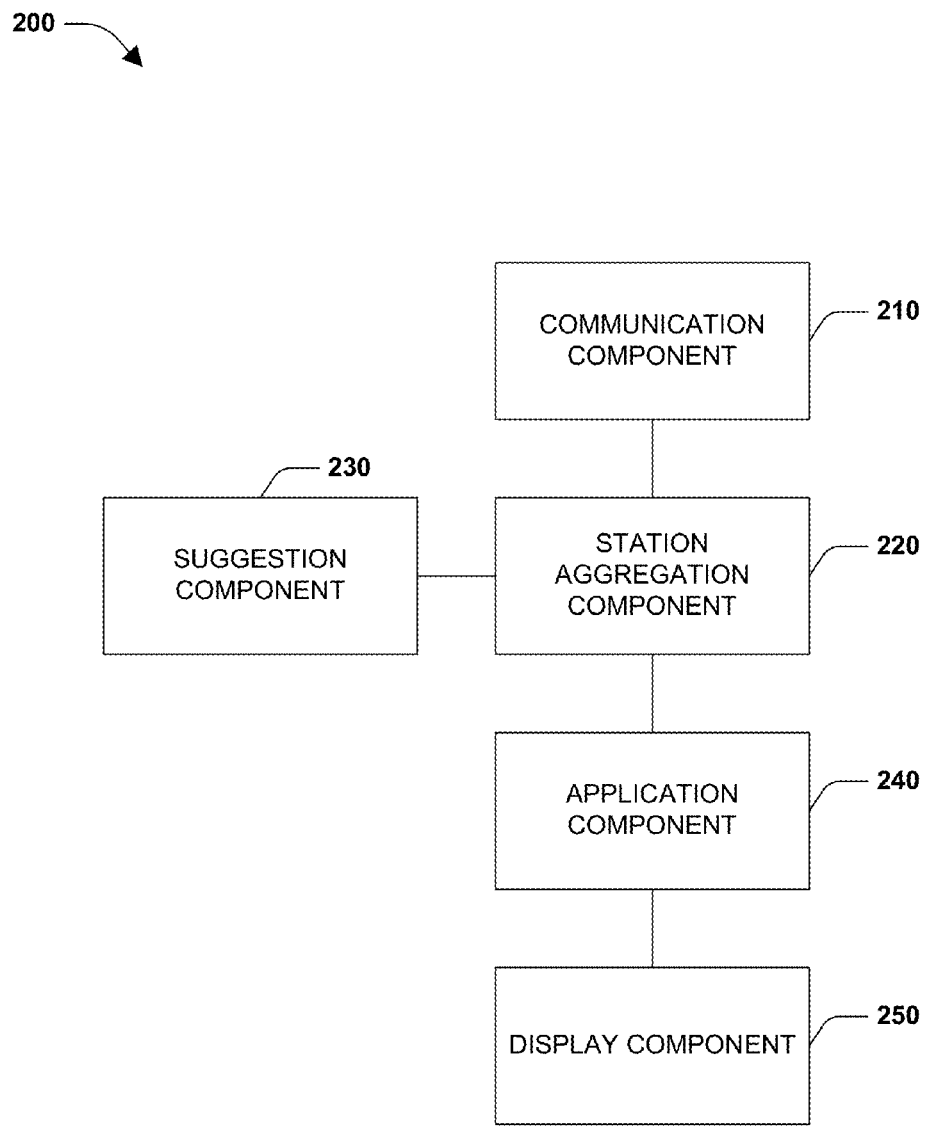
FIG. 2 is an illustration of an example system for content management, according to one or more embodiments.

FIG. 2 is an illustration of an example system 200 for content management, according to one or more embodiments. A system 200 for content management may include a communication component 210, a station aggregation component 220, a suggestion component 230, an application component 240 (e.g., an application installed on a mobile device which may be utilized to organize one or more aggregated stations), and a display component 250. In one or more embodiments, the system 200 for content management may be employed within a mobile device. The system 200 may also include a location component (e.g., GPS device). The communication component 210 may enable the system 200 to be communicatively coupled to another system, such as the system 100 of FIG. 1 or a system associated with a vehicle, for example. The communication component 210 may transmit a list of one or more preset stations or a list of one or more favorite stations, or one or more of the preset stations or favorite stations such that another system may be synchronized with the system 200 of FIG. 2.

The station aggregation component 220 may gather one or more stations available for consumption, such as one or more available stations or one or more featured stations, for example. The application component, 240 may enable a user to build a list of stations when a user is utilizing the system 200. In one example, the application component 240 may execute a station manager which builds lists of stations. The application component 240 may receive one or more user designations or other user input which defines a station as a preset station or a favorite station. In other words, the application component 240 may receive designations for one or more respective stations. Here, a user designation of one or more of the user designations may be a preset designation or a favorite designation (e.g., defining a station). In this way, a user may utilize the application component 240 to define one or more stations as a preset station or a favorite station.

Further, the application component may build lists of one or more preset stations or a list of one or more favorite stations from one or more of the stations based on one or more of the user designations, user input, or defining actions provided by the user. In one or more embodiments, the application component 240 may select one or more top stations and automatically populate these stations as presets or favorites. In other embodiments, the application component 240 may utilize user input or user designations to define presets or favorites accordingly. Favorites or presets may be marked visually with an indicator, such as a star or marked with a different color, as displayed by the display component 250. The display component may confirm one or more of the user designations for one or more respective or corresponding stations.

Similarly to the suggestion component 130 of FIG. 1, the suggestion component 230 of the system 200 of FIG. 2 may provide one or more suggested stations based on one or more other applications associated with the system 200 for content management. For example, if a workout application is running when a user listens to a playlist, station, etc., the application component 240 may associate that station with a context of workout music. Further, when the communication component 210 is communicatively coupled to another system, such as the system 100 of FIG. 1, the application component 240 may determine or elect not to synchronize or otherwise transfer the workout station to the system 100 if it is determined that the system 100 is not associated with working out, for example.

Figure 3:
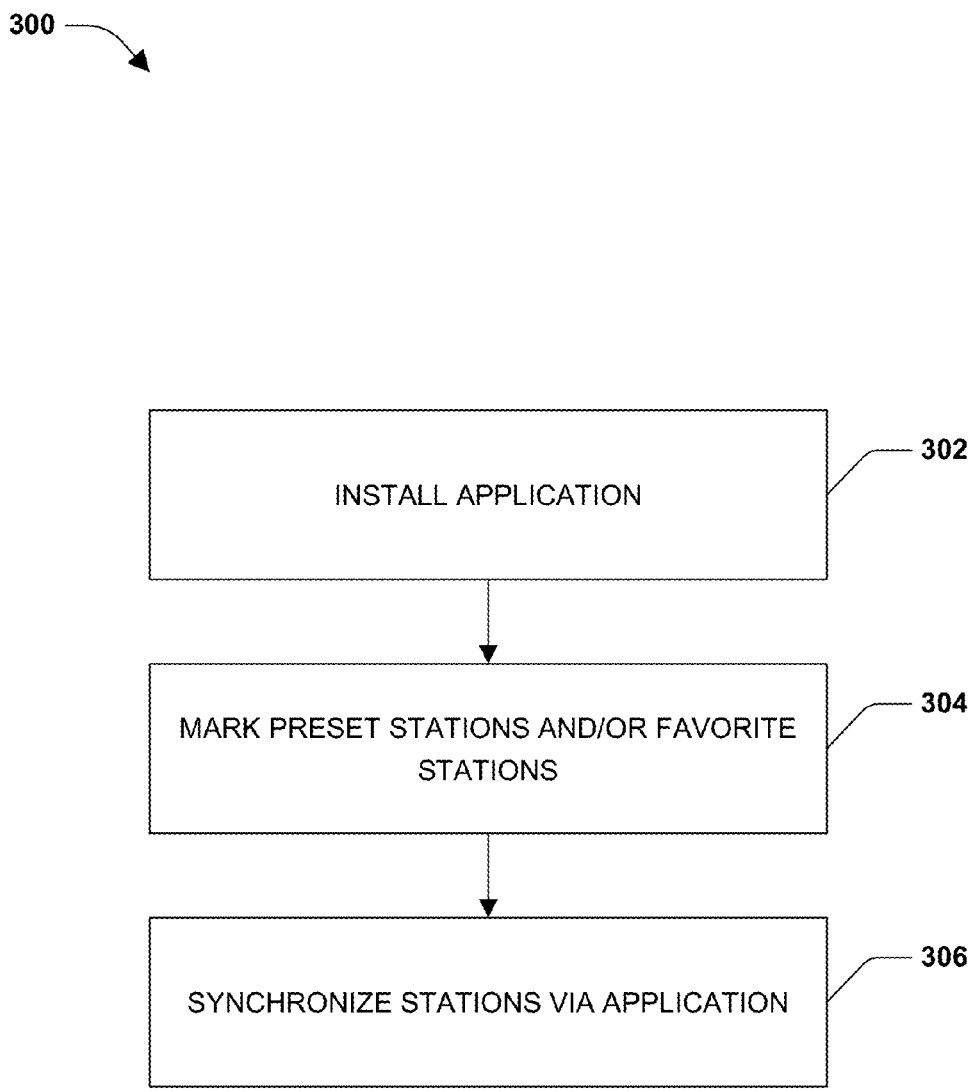
FIG. 3 is an illustration of an example flow diagram of a method for content management, according to one or more embodiments.

FIG. 3 is an illustration of an example flow diagram of a method 300 for content management, according to one or more embodiments. In one or more embodiments, the method 300 may include installing an application on a mobile device where the application may be utilized for organizing one or more presets or favorite stations at 302. At 304, the method 300 may include marking one or more stations as a preset or as a favorite utilizing the installed application. At 306, the method 300 may include synchronizing one or more stations with another system via the application or utilizing the mobile device. In this way, the other system may access one or more of the preset or favorite stations setup utilizing the application.

Figure 4:
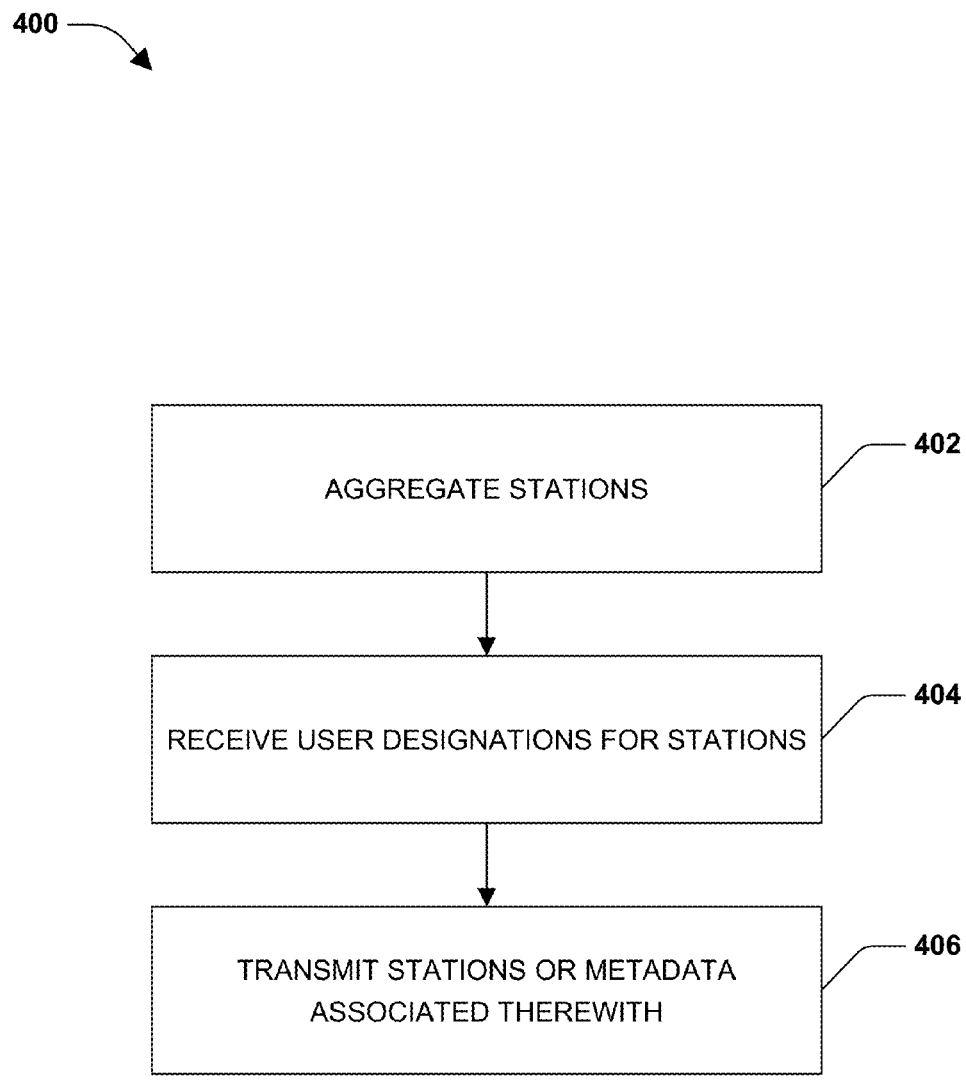
FIG. 4 is an illustration of an example flow diagram of a method for content management, according to one or more embodiments.

FIG. 4 is an illustration of an example flow diagram of a method 400 for content management, according to one or more embodiments. The method 400 may include aggregating one or more stations at 402, receiving one or more user designations for one or more of the respective stations, wherein a user designation of one or more of the user designations is a preset designation or a favorite designation at 404, and transmitting one or more of the stations based on one or more of the corresponding user designations at 406. In one or more embodiments, the method 400 may include displaying confirmation for one or more of the user designations for one or more of the respective stations, rendering a list of one or more preset stations or a list of one or more favorite stations based on one or more of the user designations for one or more of the respective stations, suggesting one or more suggested stations based on one or more applications associated with a mobile device, suggesting one or more suggested stations based on user activity associated with a mobile device, receiving user activity associated with one or more of the transmitted stations, wherein the user activity occurs on board a vehicle.

Figure 5:
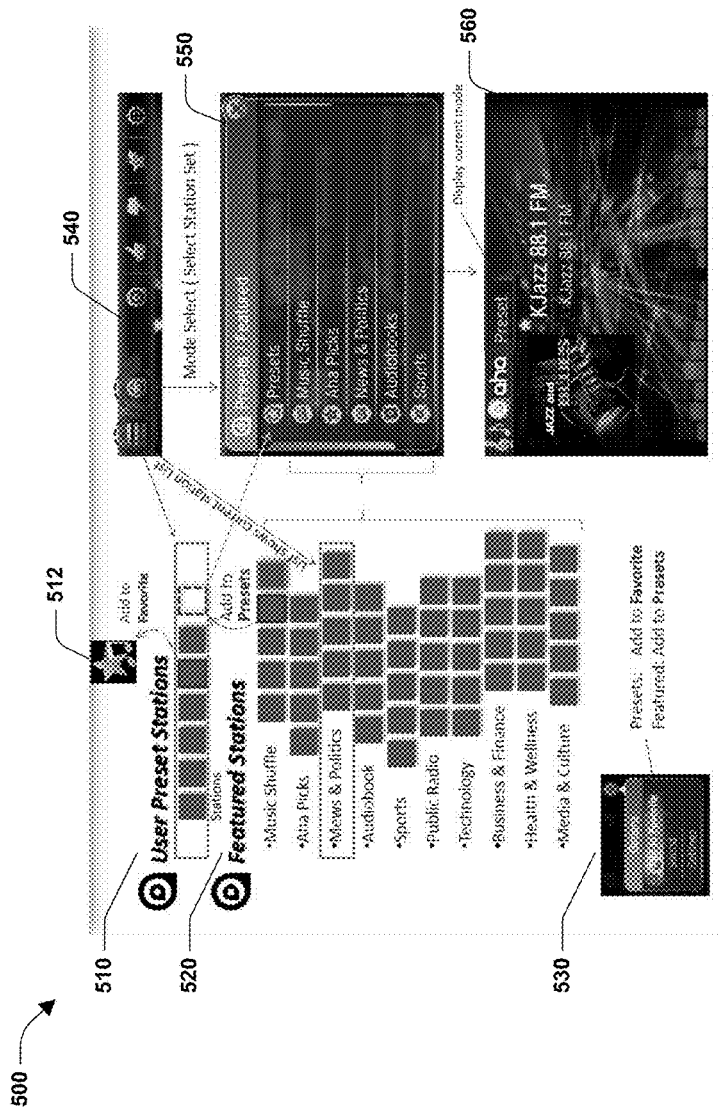
FIG. 5 is an illustration of an example interface associated with a system for content management, according to one or more embodiments.

FIG. 5 is an illustration of an example interface 500 associated with a system for content management, according to one or more embodiments. The interface 500 of FIG. 5 may include a preset station list 510, an 'add to favorite' option 512, a featured station list 520, a menu bar 540, a top menu 550, a top screen 560, and a drop down menu 530. The drop down menu 530 may provide one or more different options based on whether a station is associated with a preset status/designations or a favorite status/designation.

Figure 6:
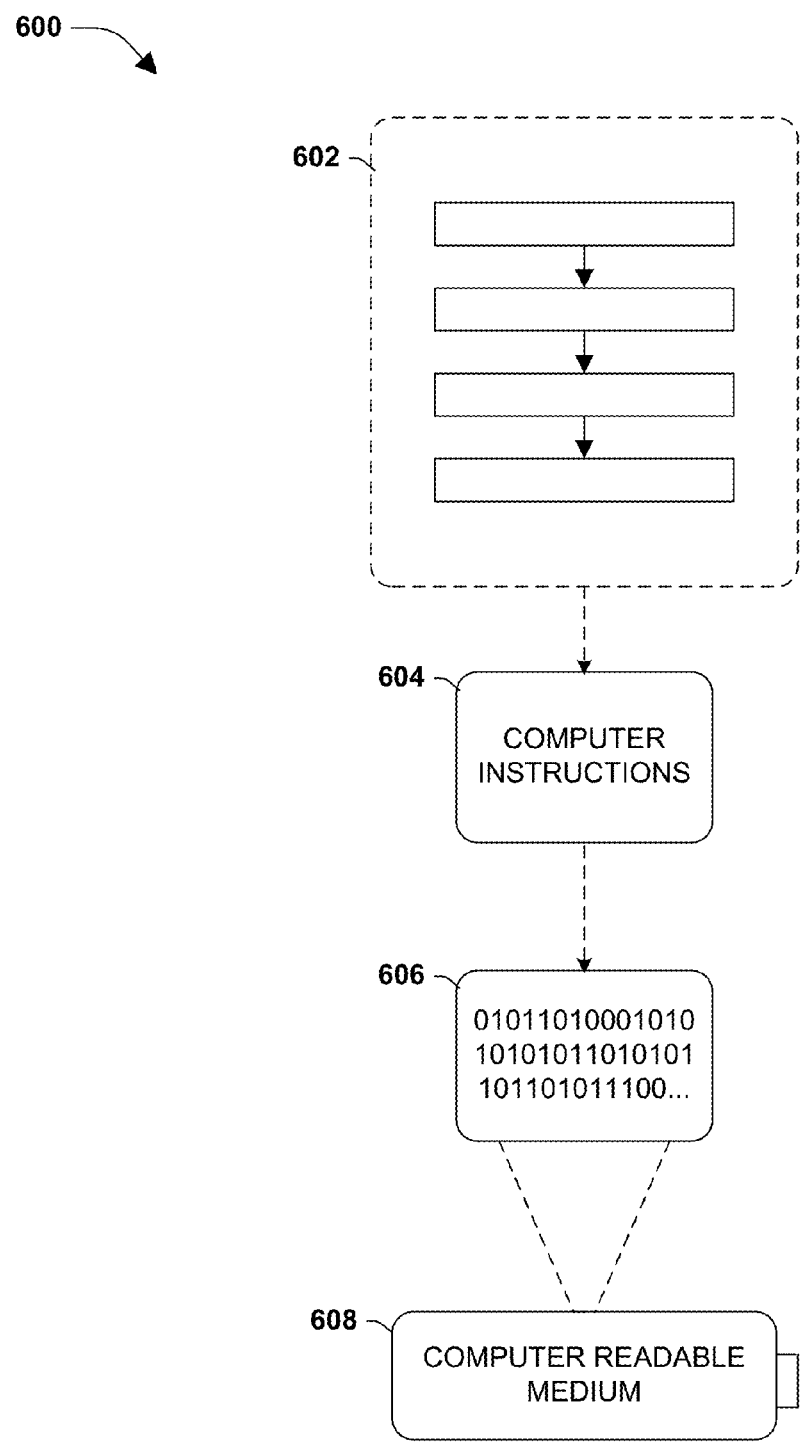
FIG. 6 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This computer-readable data 606, such as binary data including a plurality of zero's and one's as shown in 606, in turn includes a set of computer instructions 604 configured to operate according to one or more of the principles set forth herein. In one such embodiment 600, the processor-executable computer instructions 604 are configured to perform a method 602, such as the method 300 of FIG. 3 or the method 400 of FIG. 4. In another embodiment, the processor-executable instructions 604 are configured to implement a system, such as the system 100 of FIG. 1 or the system 200 of FIG. 2. Many such computer-readable media are devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 7 and the following discussion provide a description of a suitable computing environment to implement embodiments of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one or more embodiments provided herein. In one configuration, computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other embodiments, device 712 includes additional features or functionality. For example, device 712 may include additional storage such as removable storage or non-removable storage, including, but not limited to, magnetic storage, optical storage, etc. Such additional storage is illustrated in FIG. 7 by storage 720. In one or more embodiments, computer readable instructions to implement one or more embodiments provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 712. Any such computer storage media is part of device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 712 includes input device(s) 724 such as keyboard, mouse, pen, voice input device, touch input device, infrared cameras, video input devices, or any other input device. Output device(s) 722 such as one or more displays, speakers, printers, or any other output device may be included with device 712. Input device(s) 724 and output device(s) 722 may be connected to device 712 via a wired connection, wireless connection, or any combination thereof. In one or more embodiments, an input device or an output device from another computing device may be used as input device(s) 724 or output device(s) 722 for computing device 712. Device 712 may include communication connection(s) 726 to facilitate communications (e.g., via network 728) with one or more other devices 730.

According to one or more aspects, a system for content management is provided, including a communication component communicatively coupling the system to a mobile device, wherein an application of the mobile device defines one or more stations as a preset station or a favorite station. The system may include a management component. The management component may receive one or more of the stations defined by the application of the mobile device. The management component may organize one or more of the stations based on whether a station of one or more of the stations may be a preset station or a favorite station. The management component may receive a station selection. The system may include a presentation component rendering one or more notifications, wherein one or more of the notifications may be associated with a station corresponding to the station selection.

In one or more embodiments, the management component may enable one or more of the stations to be redefined such that a previously defined preset station may be defined as a favorite station based on a user input. The management component may receive one or more of the stations from a cloud or facilitate playback of the station corresponding to the station selection. Further, the management component may be employed within a vehicle to organize one or more of the stations defined by the application of the mobile device. The presentation component may render a list of one or more preset stations or a list of one or more favorite stations. The communication component may transmit the station selection or a user input. Additionally, the communication component may communicatively couple the system to the mobile device via a Bluetooth channel. The system may include a suggestion component providing one or more suggested stations based on user activity. The presentation component may include one or more displays or one or more speakers, wherein one or more of the notifications may be a visual notification or audio notification.

According to one or more aspects, a system for content management is provided, including a communication component communicatively coupling the system to a vehicle, a station aggregation component gathering one or more stations available for consumption, an application component, and a display component. The application component may receive one or more user designations for one or more of the respective stations, wherein a user designation of one or more of the user designations is a preset designation or a favorite designation. The application component may build a list of one or more preset stations and a list of one or more favorite stations from one or more of the stations based on one or more of the user designations. The display component may confirm one or more of the user designations for one or more of the respective stations.

In one or more embodiments, the communication component may transmit the list of one or more preset stations or the list of one or more favorite stations. The system may include a suggestion component providing one or more suggested stations based on one or more other applications associated with the system for content management. The system for content management may be employed within a mobile device.

According to one or more aspects, a method for content management is provided, including aggregating one or more stations, receiving one or more user designations for one or more of the respective stations, wherein a user designation of one or more of the user designations is a preset designation or a favorite designation, and transmitting one or more of the stations based on one or more of the corresponding user designations.

In one or more embodiments, the method includes rendering a list of one or more preset stations or a list of one or more favorite stations based on one or more of the user designations for one or more of the respective stations. The method may include receiving user activity associated with one or more of the transmitted stations, wherein the user activity occurs on board a vehicle. The method may include displaying confirmation for one or more of the user designations for one or more of the respective stations. The method may include suggesting one or more suggested stations based on one or more applications associated with a mobile device. The method may include suggesting one or more suggested stations based on user activity associated with a mobile device.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system for content management, comprising:
a processing unit and a memory;
a communication component communicatively coupling the system to a mobile device using a telematics unit, wherein an application of the mobile device defines one or more stations as a preset station or a favorite station;
a management component:
receiving one or more of the stations defined by the application of the mobile device at the memory;
assigning, using the processing unit, the one or more stations as the preset station or the favorite station based on a genre of music that is listed as an interest in a social networking profile associated with a user;
identifying, using the processing unit, all other applications running concurrently with the application of the mobile device;
identifying, using the processing unit, a category associated with one of the other applications;
inferring, using the processing unit, a context associated with one of the other applications based on the category of the other application, wherein the context is a use context which is indicative of a task being performed by the user while the other application is being executed;
determining, using the processing unit, an association between one or more of the stations to the context associated with one of the other applications;
organizing, using the processing unit, one or more of the stations based on whether a station of one or more of the stations is the preset station or the favorite station and based on the one or more of the stations associated with the context associated with the other application; and
receiving a station selection at the memory; and
a presentation component rendering one or more notifications on a display, wherein one or more of the notifications is associated with a station corresponding to the station selection,
wherein the management component causes the presentation component to playback the station corresponding to the station selection.

2. The system of claim 1, wherein the management component enables one or more of the stations to be redefined such that a previously defined preset station is defined as the favorite station based on a user input.

3. The system of claim 1, wherein the presentation component renders a list of one or more preset stations or a list of one or more favorite stations.

4. The system of claim 1, wherein the communication component transmits the station selection or a user input.

5. The system of claim 1, comprising a suggestion component providing one or more suggested stations based on user activity.

6. The system of claim 1, wherein the communication component communicatively couples the system to the mobile device via a wireless channel.

7. The system of claim 1, wherein the management component receives one or more of the stations from a cloud.

8. The system of claim 1, wherein the presentation component comprises one or more speakers, wherein one or more of the notifications is an audio notification.

9. The system of claim 1, wherein the management component is employed within a vehicle to organize one or more of the stations defined by the application of the mobile device.

10. A system for content management, comprising:
a processing unit and a memory;
a communication component communicatively coupling the system to a vehicle using a wireless unit;
a station aggregation component gathering, at the memory, one or more stations available for consumption;
an application component:
  executing a first application;
  receiving one or more user designations for one or more of the respective stations at the memory, wherein a user designation of one or more of the user designations is a preset station or a favorite station;
  identifying all other applications running in concurrence with the first application;
  identifying a category associated with one of the other applications;
  inferring a context associated with one of the other applications based on the category of the other application, wherein the context is a use context indicative of a task being performed by a user while one of the other applications is being executed; and
  determining an association between one or more of the stations to the context associated with one of the other applications;
  automatically populating a list, using the processing unit, of one or more stations as the preset station or the favorite station based on a genre of music that is listed as an interest in a social networking profile associated with the user and based on the one or more of the stations with the context associated with the other application;
a display confirming one or more of the user designations for one or more of the respective stations by rendering the list such that the list has visual indications which distinguish the preset station and the favorite station using different colors; and
a management component that causes playback, using the processing unit on the vehicle, of one or more of the stations corresponding to a station selection.

11. The system of claim 10, wherein the communication component transmits the list of one or more preset stations or the list of one or more favorite stations.

12. The system of claim 10, comprising a suggestion component providing one or more suggested stations based on one or more of the other applications associated with the system for content management.

13. The system of claim 10, wherein the system for content management is employed within a mobile device.

14. A method for content management, comprising:
aggregating, at a memory, one or more stations;
receiving, at the memory, one or more user designations for one or more of the respective stations, wherein a user designation of one or more of the user designations is a preset station or a favorite station;
executing, at the memory, a first application;
identifying, using a processing unit, all other applications running concurrently with the first application;
identifying, using the processing unit, a category associated with one of the other applications;
inferring, using the processing unit, a context associated with one of the other applications based on the category of the other application, wherein the context is a use context indicative of a task being performed by a user while one of the other applications is being executed;
determining an association between one or more of the stations to the context associated with one of the other applications;
populating a list, using the processing unit, of one or more stations as the preset station or the favorite station based on a genre of music that is listed as an interest in a social networking profile associated with the user and based on the one or more of the stations associated with the context associated with the other application;
transmitting, using a wireless unit, one or more of the stations based on one or more of the corresponding user designations and a name of one or more of the stations; and
causing playback, using the processing unit, on a vehicle, of one or more of the stations corresponding to a station selection.

15. The method of claim 14, comprising rendering a list of one or more preset stations or a list of one or more favorite stations based on one or more of the user designations for one or more of the respective stations.

16. The method of claim 14, comprising receiving user activity associated with one or more of the transmitted stations, wherein the user activity occurs on board the vehicle.

17. The method of claim 14, comprising displaying confirmation for one or more of the user designations for one or more of the respective stations.

18. The method of claim 14, comprising suggesting one or more suggested stations based on one or more applications associated with a mobile device.

19. The method of claim 14, comprising suggesting one or more suggested stations based on user activity associated with a mobile device.

* * * * *